United States Patent
Sfaradi et al.

(10) Patent No.: US 9,241,127 B2
(45) Date of Patent: Jan. 19, 2016

(54) WIDE DYNAMIC RANGE IMAGE PROCESSING METHOD AND IMAGE SIGNAL PROCESSOR USING THE SAME

(71) Applicant: Samsung Electronics Co., Ltd., Suwon-Si, Gyeonggi-Do (KR)

(72) Inventors: Roee Sfaradi, Nes Ziona (IL); Amit Eisenberg, Kiryat Ono (IL); Oded Monzon, Modi'in-Maccabim-Re'ut (IL)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 21 days.

(21) Appl. No.: 14/200,171

(22) Filed: Mar. 7, 2014

(65) Prior Publication Data

US 2014/0267914 A1  Sep. 18, 2014

(30) Foreign Application Priority Data

Mar. 14, 2013 (KR) .................. 10-2013-0027510

(51) Int. Cl.
*H04N 5/91* (2006.01)
*H04N 9/04* (2006.01)
*G06T 5/00* (2006.01)
*H04N 5/355* (2011.01)
*H04N 5/353* (2011.01)
*H04N 5/235* (2006.01)

(52) U.S. Cl.
CPC ............... *H04N 5/91* (2013.01); *G06T 5/007* (2013.01); *G06T 5/009* (2013.01); *H04N 5/2355* (2013.01); *H04N 5/3535* (2013.01); *H04N 5/35554* (2013.01); *H04N 9/045* (2013.01); *G06T 2207/10016* (2013.01); *G06T 2207/10024* (2013.01); *G06T 2207/10144* (2013.01); *G06T 2207/20208* (2013.01); *H04N 5/2353* (2013.01)

(58) Field of Classification Search
CPC ..................... H04N 5/3535; H04N 5/35554
See application file for complete search history.

(56) References Cited

U.S. PATENT DOCUMENTS

| | | | |
|---|---|---|---|
| 7,019,777 | B2 | 3/2006 | Sun |
| 7,149,262 | B1 | 12/2006 | Nayar et al. |
| 7,649,560 | B2 | 1/2010 | Henderson |
| 7,684,645 | B2 | 3/2010 | Vitsnudel et al. |
| 7,777,804 | B2 | 8/2010 | Shan et al. |
| 7,825,969 | B2 | 11/2010 | Tico et al. |
| 7,940,311 | B2 | 5/2011 | Trimeche et al. |
| 8,059,174 | B2 | 11/2011 | Mann et al. |
| 2006/0050159 | A1 * | 3/2006 | Ahn .......................... 348/272 |
| 2008/0043114 | A1 * | 2/2008 | Sung et al. ................ 348/221.1 |
| 2009/0091645 | A1 * | 4/2009 | Trimeche et al. ............. 348/273 |
| 2010/0157078 | A1 | 6/2010 | Atanassov et al. |
| 2011/0194850 | A1 | 8/2011 | Joo |
| 2012/0218426 | A1 * | 8/2012 | Kaizu et al. ................ 348/208.4 |

* cited by examiner

*Primary Examiner* — Albert Cutler
(74) *Attorney, Agent, or Firm* — Harness, Dickey & Pierce, P.L.C.

(57) ABSTRACT

An image processing method includes the operations of receiving N×N raw data from an N×N sub pixel array including a plurality of first exposure pixels and second exposure pixels having different exposure times, respectively; obtaining a difference value between a value obtained by normalizing an interpolated value of the first exposure pixels and an interpolated value of the second exposure pixels for each channel in the N×N sub pixel array based on the N×N raw data; setting a mismatching value to a maximum value among difference values obtained for the respective channels; and setting a corrected value of a central pixel in the N×N sub pixel array based on the N×N raw data and based on the mismatching value and a threshold value.

9 Claims, 10 Drawing Sheets

(a) short greens (b) long greens (c) short reds (d) long reds (e) short blues (f) long blues

WIDE DYNAMIC RANGE IMAGE PROCESSING METHOD AND IMAGE SIGNAL PROCESSOR USING THE SAME

CROSS-REFERENCE TO RELATED APPLICATIONS

This application claims the benefit of Korean Patent Application No. 10-2013-0027510, filed on Mar. 14, 2013, in the Korean Intellectual Property Office, the disclosure of which is incorporated herein in its entirety by reference.

BACKGROUND

Embodiments of inventive concepts relate to an image processing method, and more particularly, to a wide dynamic range (WDR) image processing method and/or an image signal processor using the same.

An image processing apparatus includes an image sensor that converts an optical signal to an electrical signal and an image processor that processes and outputs the electrical signal to a display device. WDR technology is used to display both bright and dark areas in an image. At this time, a pixel array of the image sensor includes two types of pixels having different exposure times.

The image processor reconstructs an image based on pixel values. When the image is reconstructed using the pixel values without interpolation of the pixel values, an image of high resolution can be obtained. However, when the pixel values of a fast moving image are directly used, a ghost artifact may be produced.

Meanwhile, a pixel with a long exposure time may cause distortion in an image.

SUMMARY

According to at least one example embodiment of the inventive concepts, there is provided an image processing method including the operations of receiving N×N raw data from an N×N sub pixel array including a plurality of first exposure pixels and second exposure pixels having different exposure times, respectively; obtaining a difference value between a value obtained by normalizing an interpolated value of the first exposure pixels and an interpolated value of the second exposure pixels for each channel in the N×N sub pixel array based on the N×N raw data; setting a mismatching value to a maximum value among difference values obtained for the respective channels; and setting a corrected value of a central pixel in the N×N sub pixel array based on the N×N raw data and based on the mismatching value and a threshold value.

At least one example embodiment discloses a system including an image sensor having a plurality of pixels configured to generate pixel values, the plurality of pixels associated with one of a plurality of colors and being one of a first exposure type and a second exposure type, a first exposure time of the first exposure type being less than a second exposure time of the second exposure type and an image signal processor configured to receive the pixel values, generate a difference value based on differences between interpolated values of pixels of different exposure types and associated with the same color, adjust a selected pixel value of the pixel values based on a first process or a second process, the image signal processor configured to select the first process or the second process based on the difference value, the selected pixel value associated with a selected pixel of the plurality of pixels.

BRIEF DESCRIPTION OF THE DRAWINGS

The above and other features and advantages of inventive concepts will become more apparent by describing in detail example embodiments thereof with reference to the attached drawings in which.

DETAILED DESCRIPTION OF EXAMPLE EMBODIMENTS

Inventive concepts now will be described more fully hereinafter with reference to the accompanying drawings, in which example embodiments are shown. Example embodiments may, however, be embodied in many different forms and should not be construed as limited to example embodiments set forth herein. Rather, example embodiments are provided so that this disclosure will be thorough and complete, and will fully convey the scope of the invention to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Figure 1:
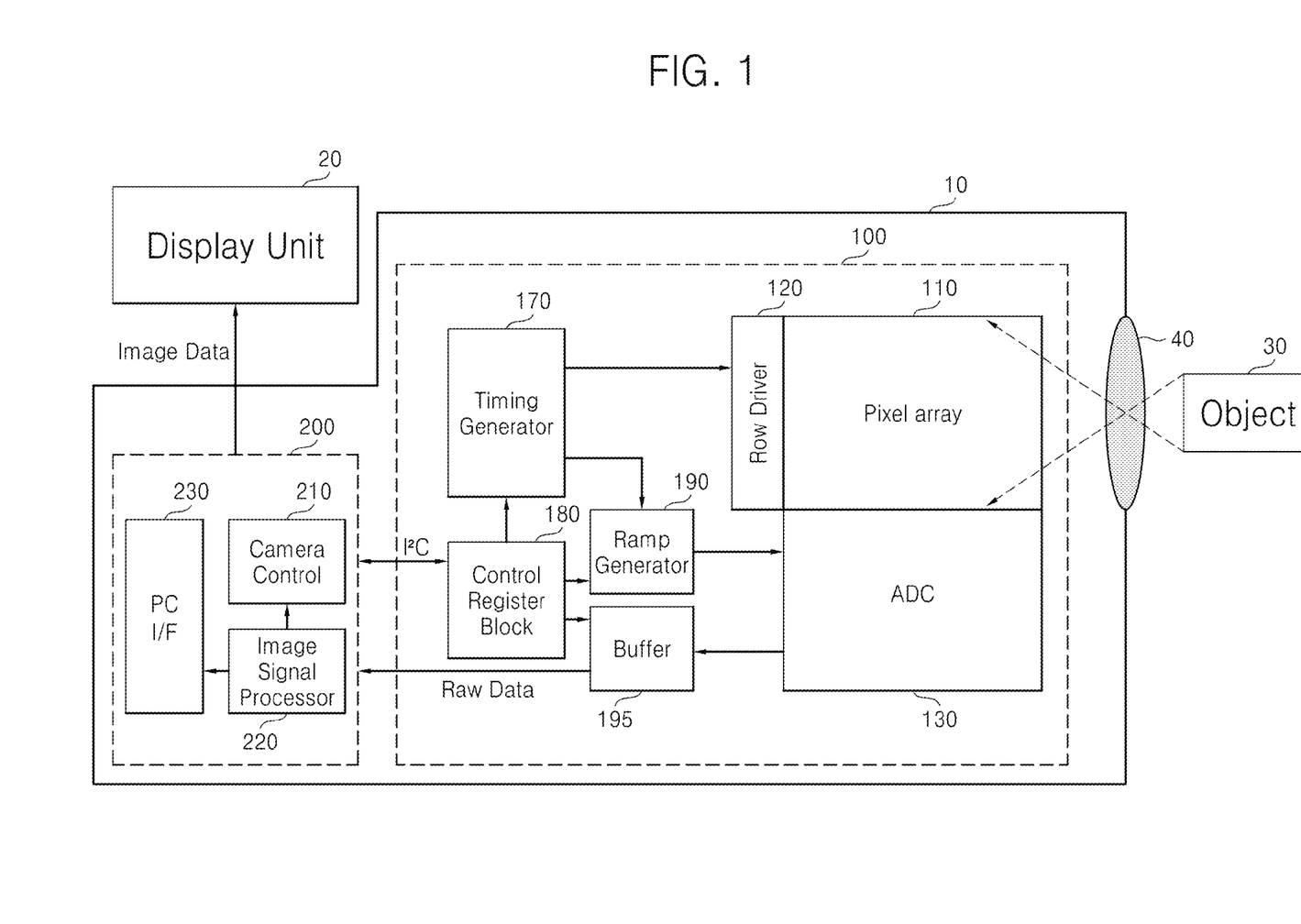
FIG. 1 is a schematic block diagram of an image processing apparatus according to at least one example embodiment of inventive concepts.

FIG. 1 is a schematic block diagram of an image processing apparatus 10 according to at least one example embodiment of inventive concepts. The image processing apparatus 10 may include an image sensor 100 and an image processor 200. The image sensor 100 may include a light source (not shown) that emits an optical signal. The image sensor 100 is controlled by the image processor 200 to receive an optical signal reflected from an external object 30 through a lens 40 and convert the optical signal to an electrical signal to generate raw data. The image processor 200 may process the raw data to generate image data and output the image data to a display unit 20.

The display unit 20 may be any device that can output an image. For instance, the display unit 20 may be a computer, a mobile phone, or any type of image display terminal.

The image processor 200 includes a camera control 210, an image signal processor 220, and a personal computer (PC) interface (I/F) 230. The camera control 210 controls a control register block 180. The camera control 210 may control the image sensor 100, and more specifically, the control register block 180 using an inter-integrated circuit (I²C), but the scope of inventive concepts is not restricted thereto.

The image signal processor 220 receives raw data, i.e., an output signal of a buffer 195, processes the raw data for display, and outputs processed image data to the display unit 20 through the PC I/F 230.

The image signal processor 220 is positioned within the image processor 200 in FIG. 1, but the position is not limited thereto. For instance, the image signal processor 220 may be positioned within the image sensor 100.

The image sensor 100 includes a pixel array 110, a row driver 120, an analog-to-digital converter (ADC) 130, a timing generator 170, the control register block 180, a ramp generator 190, and the buffer 195.

The pixel array 110 converts an optical image signal to an electrical pixel signal using a plurality of pixels. The pixel array 110 may be implemented in a red, green and blue (RGB) pixel format. In other words, each of the pixels may be implemented as a red pixel which converts light in the red spectrum into an electrical signal, a green pixel which converts light in the green spectrum into an electrical signal, or a blue pixel which converts light in the blue spectrum into an electrical signal. Alternatively, the pixel array 110 may be implemented in a cyan, magenta and yellow (CMY) pixel format. In other words, each pixel may be implemented as a cyan pixel, a magenta pixel, or a yellow pixel. Hereinafter, example embodiments in which each pixel is implemented as a red, green or blue pixel will be described, but inventive concepts are not restricted thereto.

Each pixel may be either of two types having different exposure times. In detail, each of red, green and blue pixels may be a first exposure pixel having a first exposure time "exposure_short" or a second exposure pixel having a second exposure time "exposure_long". The first exposure time may be shorter than the second exposure time. Hereinafter, for convenience sake in the description, a first exposure pixel is called a short exposure pixel and a second exposure pixel is called a long exposure pixel. Each pixel may be implemented by a photo diode or a pinned photo diode.

The row driver 120 drives the pixel array 110 in units of rows. For instance, the row driver 120 may generate a row selection signal. In detail, the row driver 120 may decode a row control signal (e.g., an address signal) generated by the timing generator 170 and select at least one of the rows in the pixel array 110 in response to the decoded row control signal. The pixel array 110 outputs a pixel signal from a row selected by the row selection signal received from the row driver 120 to the ADC 130. The pixel signal may include a reset signal and an image signal.

The ADC 130 compares a pixel signal with a ramp signal received from the ramp generator 190, counts a comparison result signal, and outputs a count value to the buffer 195. The ADC 130 may be implemented by a column parallel single-slope ADC.

The timing generator 170 may control the operations of the row driver 120, the ADC 130, and the ramp generator 190.

The control register block 180 may control the operations of the timing generator 170, the ramp generator 190, and the buffer 195. The control register block 180 is controlled by the camera control 210. The camera control 210 may be implemented in hardware or software.

The ramp generator 190 may generate a ramp signal according to the control of the timing generator 170. The ramp signal may ramp up or down. The buffer 195 temporarily stores raw data output from the ADC 130 and outputs the raw data to the image processor 200 according to the control of the control register block 180.

Figure 2:
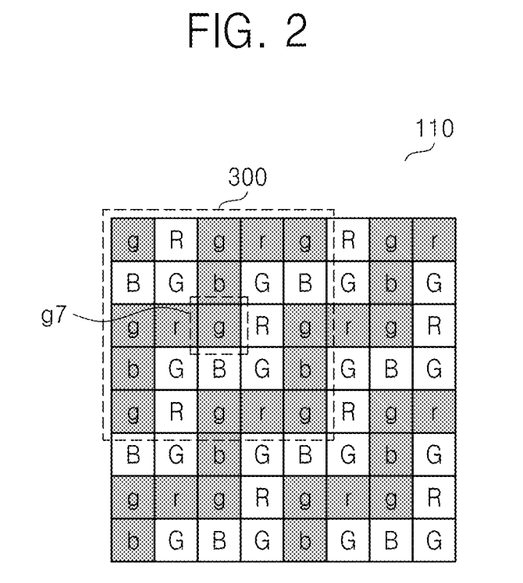
FIG. 2 is a diagram of a pixel array according to at least one example embodiment of inventive concepts.
Figure 3:
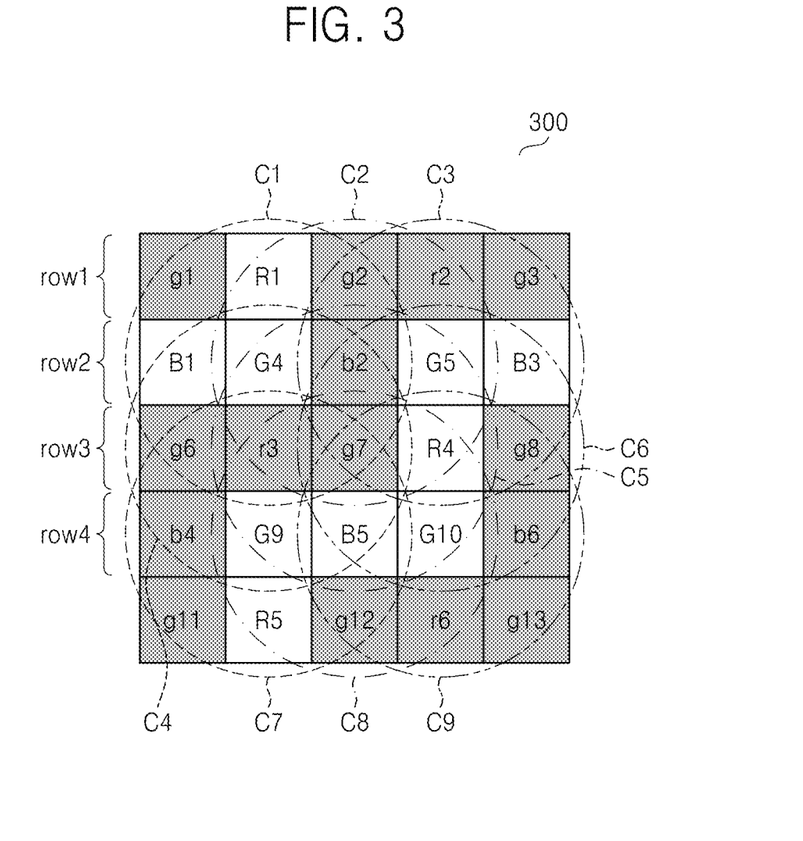
FIG. 3 is a diagram of an N×N sub pixel array included in the pixel array illustrated in FIG. 2.

FIG. 2 is a diagram of the pixel array 110 according to at least one example embodiment of inventive concepts. FIG. 3 is a diagram of an N×N sub pixel array 300 included in the pixel array 110 illustrated in FIG. 2.

Referring to FIGS. 2 and 3, pixels in the pixel array 110 may be arranged in a Bayer pattern. Each of the pixels may be either a short exposure pixel or a long exposure pixel. In FIG. 2, pixels denoted by small letters "r", "g", and "b" are short exposure pixels and pixels denoted by capital letters R, G, and B are long exposure pixels.

In order to increase image resolution and to decrease artifacts, the pixels are disposed in the following manner. All green pixels "g" or G in each row are the same exposure type of pixels. The short exposure green pixels "g" and the long exposure green pixels G are disposed in alternate rows. In other words, green pixels in respective two adjacent rows are different exposure types of pixels. For instance, green pixels g1, g2, and g3 in a first row row1 are all short exposure green pixels and green pixels G4 and G5 in a second row row2 are all long exposure green pixels. Green pixels g6, g7, and g8 in a third row row3 are all short exposure green pixels and green pixels G9 and G10 in a fourth row row4 are all long exposure green pixels.

Color pixels, i.e., red pixels and blue pixels are disposed in a chess mosaic scheme. A color pixel between color pixels of the same color in a vertical or horizontal direction in a channel have a different exposure type than the other color pixels while pixels aligned with the color pixel in a diagonal direction have the same exposure type as the color pixel. For instance, a red pixel r3 is a short exposure pixel. Red pixels R1, R5, and R4 adjacent to the red pixel r3 in the vertical and horizontal directions are long exposure pixels while red pixels r2 and r6 adjacent to the red pixel r3 in the diagonal direction are short exposure pixels.

Several terms for explaining example embodiments of inventive concepts will be described with reference to FIG. 3. A pixel g7 for which a correction value will be obtained is set as a central pixel. The N×N sub pixel array 300 having the central pixel g7 as a center is set. Here, N is an integer of at least 3, for example, N=5 in FIG. 3.

The center of the central pixel g7 may coincide with the center of the N×N sub pixel array 300, but inventive concepts are not restricted thereto. In other embodiments, N may be 4 and an N×N sub pixel array having the central pixel g7 as a center may be a 4×4 sub pixel array having pixels g1, r2, b4, and G10 as vertices.

A plurality of areas C1 through C9 nearby the central pixel g7 are defined as adjacent areas. The adjacent areas C1 through C9 may be all M×M pixel areas included in the N×N sub pixel array 300. Here, M is an integer of at least 2 and less than N. Although M=3 with respect to the adjacent areas C1 through C9 illustrated in FIG. 3, inventive concepts are not restricted thereto. In other embodiments, M may be 4.

Reference numerals g1 through g13 are used to denote pixels, but hereinafter they may also denote pixel values for convenience' sake in the description. In other words, the pixel value of the central pixel g7 is g7 and this also applies to the other pixels.

Figure 4:
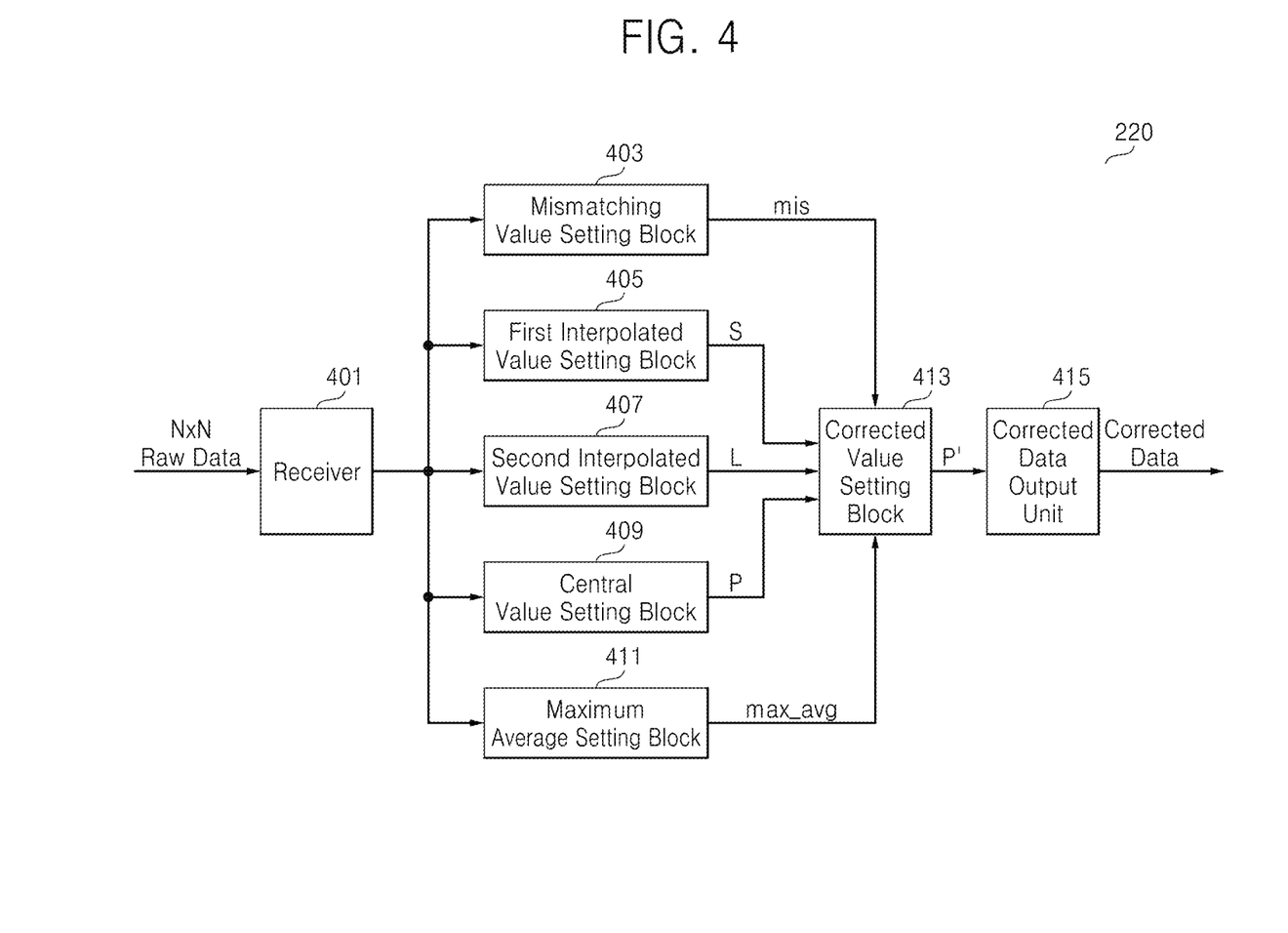
FIG. 4 is a block diagram of an image signal processor illustrated in FIG. 1.

FIG. 4 is a block diagram of the image signal processor 220 illustrated in FIG. 1. Referring to FIG. 4, the image signal processor 220 may include a receiver 401, a mismatching value setting block 403, a first interpolated value setting block 405, a second interpolated value setting block 407, a central value setting block 409, a maximum average setting block 411, a corrected value setting block 413, and a corrected data output unit 415. The receiver 401 receives N×N raw data from the N×N sub pixel array 300. Hereinafter, on the assumption that the N×N sub pixel array 300 is assumed to be the N×N sub pixel array 300 illustrated in FIG. 3, the operations of the image signal processor 220 will be described.

Figure 5:
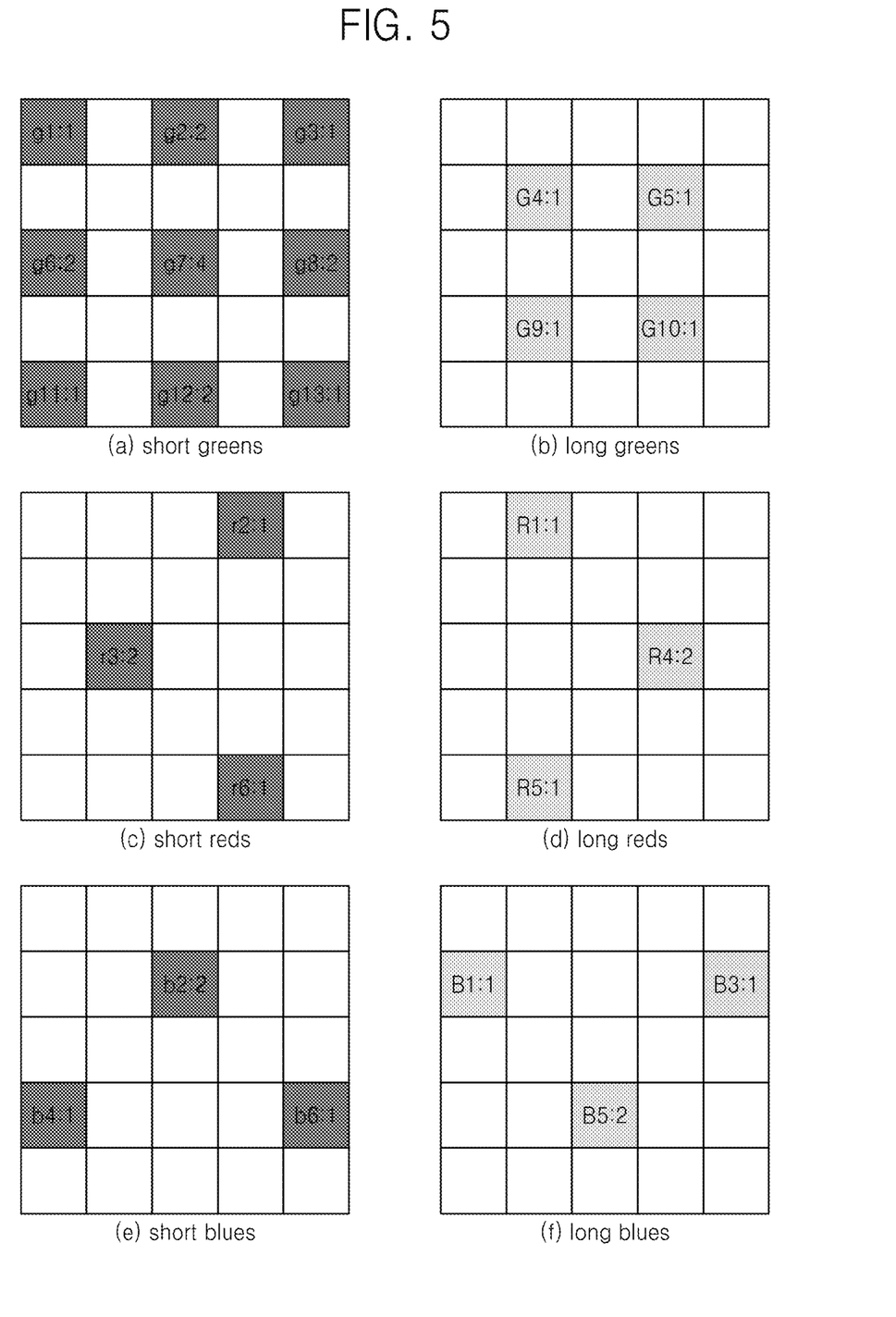
FIGS. 5A through 5F are diagrams showing an example of setting a weight for each channel to set a mismatching value in the N×N sub pixel array illustrated in FIG. 3.

The mismatching value setting block 403 obtains a difference value between a value obtained by normalizing an interpolated value for the first exposure pixels and an interpolated value for the second exposure pixels for each channel in the N×N sub pixel array 300 based on the N×N raw data and sets a maximum value among difference values for the respective channels as a mismatching value "mis", which will be described in detail with reference to FIG. 5 later.

The first interpolated value setting block 405 sets a first interpolated value S to a value obtained by normalizing an interpolated value for the first exposure pixels having the same channel as the central pixel g7 in the N×N sub pixel array 300 based on the N×N raw data. The second interpolated value setting block 407 sets a second interpolated value L to a value obtained by normalizing an interpolated value for the second exposure pixels having the same channel as the central pixel g7 in the N×N sub pixel array 300 based on the N×N raw data.

The first interpolated value setting block 405 and the second interpolated value setting block 407 may respectively set the first interpolated value S and the second interpolated value L using Equation 1. However, inventive concepts are not restricted thereto. A more sophisticated approach which interpolates the pixel along the orientation of a local edge which the pixel is positioned on may be used.

$$S=(4*g7+g2+g6+g8+g12)/8*(\text{exposure\_long}/\text{exposure\_short})$$

$$L=(G4+G5+G9+G10)/4. \quad (1)$$

The central pixel g7 is a green pixel in the N×N sub pixel array 300 illustrated in FIG. 3. Accordingly, when Equation 1 is used, the first interpolated value S is determined by the short exposure pixels g1, g2, g3, g6, g7, g8, g11, g12, and g13 of a green channel and the second interpolated value L is determined by the long exposure pixels G4, G5, G9, and G10 of the green channel.

When the first interpolated value setting block 405 and the second interpolated value setting block 407 interpolate pixels, they may give a higher weight to a pixel closer to the central pixel g7. For instance, the first interpolated value setting block 405 may give a weight of 4 to the central pixel g7, a weight of 1 to the short exposure pixels g2, g6, g8, and g12 closest to the central pixel g7, and a weight of 0 to the short exposure pixels g1, g3, g11, and g13 second closest to the central pixel g7. The first interpolated value setting block 405 calculates a weighted average of the pixels values of the short exposure pixels g1, g2, g3, g6, g7, g8, g11, g12, and g13 of the green channel based on the weights given to the short exposure pixels g1, g2, g3, g6, g7, g8, g11, g12, and g13. The first interpolated value setting block 405 normalizes the weighted average, i.e., $(4*g7+g2+g6+g8+g12)/8$ to set the first interpolated value S. Normalizing may be performed by multiplying the weighted average $(4*g7+g2+g6+g8+g12)/8$ by the second exposure time exposure_long and then dividing a multiplication result by the first exposure time exposure_short.

Meanwhile, the long exposure pixels G4, G5, G9, and G10 are separated from the central pixel g7 by the same distance. Accordingly, the second interpolated value setting block 407 gives a weight of 1 to all of the long exposure pixels G4, G5, G9, and G10. The second interpolated value setting block 407 sets the second interpolated value L to a weighted average of pixel values of the long exposure pixels G4, G5, G9, and G10 of the green channel based on the weight.

The central value setting block 409 sets a central value P based on the N×N raw data. When the central pixel g7 is a first exposure pixel, the central value P may be set to a value obtained by normalizing the pixel value of the central pixel g7. For instance, since the central pixel g7 illustrated in FIG. 3 is a first exposure pixel, the central value P may be obtained by multiplying the pixel value of the central pixel g7 by the second exposure time exposure_long and dividing a result of the multiplication by the first exposure time exposure_short. However, when the central pixel g7 is a second exposure pixel, the pixel value of the central pixel g7 may be set as the central value P.

The maximum average setting block 411 obtains maximum values P1 through P9 among pixel values in the respective areas C1 through C9 adjacent to the central pixel g7 based on the N×N raw data. The maximum average setting block 411 may set the maximum values P1 through P9 for the respective adjacent areas C1 through C9 using Equation 2:

$$P1=\max(R1,g1,r2,g3,B1,G4,R4,g6,R5)$$

$$P2=\max(g1,r2,g2,B1,G4,b2,g6,R5,g7)$$

$$P3=\max(r2,g2,r3,G4,b2,G5,R5,g7,r6)$$

$$P4=\max(g3,B1,G4,R4,g6,R5,g8,B3,G9)$$

$$P5 = \max(B1, G4, b2, g6, R5, g7, B3, G9, b4)$$

$$P6 = \max(G4, b2, G5, R5, g7, r6, G9, b4, G10)$$

$$P7 = \max(R4, g6, R5, g8, B3, G9, R7, g11, R8)$$

$$P8 = \max(g6, R5, g7, B3, G9, b4, g11, R8, g12)$$

$$P9 = \max(R5, g7, r6, G9, b4, G10, R8, g12, R9), \quad (2)$$

where "max" denotes a maximum value of components.

The maximum average setting block 411 calculates a weighted average of the maximum values P1 through P9 of the respective adjacent areas C1 through C9 and sets the weighted average as a maximum average max_avg. The maximum average max_avg may be set using Equation 3:

$$\max\_avg = (P1 + 2*P2 + P3 + 2*P4 + 4*P5 + 2*P6 + P7 + 2*P8 + P9)/16. \quad (3)$$

According to Equation 3, the maximum average setting block 411 gives a higher weight to each of the adjacent areas C1 through C9 whose center is closer to the center of the central pixel g7. For instance, since the center of the adjacent area C5 coincides with the center of the central pixel g7, the maximum average setting block 411 gives a weight of 4 to the adjacent area C5. The center of each of the adjacent areas C2, C4, C6, and C8 is closest to the center of the central pixel g7, and therefore, the maximum average setting block 411 gives a weight of 2 to the adjacent areas C2, C4, C6, and C8. The center of each of the adjacent areas C1, C3, C7, and C9 is second closest to the center of the central pixel g7, and therefore, the maximum average setting block 411 gives a weight of 1 to the adjacent areas C1, C3, C7, and C9. The maximum average setting block 411 calculates a weighted average of the maximum values P1 through P9 of the respective adjacent areas C 1 through C9 based on the weights given to the adjacent areas C1 through C9 and sets the weighted average as the maximum average max_avg.

The corrected value setting block 413 sets a corrected value P' of the central pixel g7 of the N×N sub pixel array 300 based on the N×N raw data and whether the mismatching value "mis" is less than a threshold value "th". The setting of the corrected value P'will be described in detail with reference to FIGS. 6 and 7 later.

The corrected data output unit 415 sequentially receives and stores corrected values of pixels from the interpolated value setting block 413. After receiving the interpolated values for all pixels, the corrected data output unit 415 updates the pixel values of the pixels to the corrected values to generate corrected data and outputs the corrected data to the display unit 20.

FIGS. 5A through 5F are diagrams showing an example of setting a weight for each channel to set the mismatching value "mis" in the N×N sub pixel array 300 illustrated in FIG. 3. FIG. 5A shows weights given to the short exposure pixels of a green channel. FIG. 5B shows weights given to the long exposure pixels of the green channel. FIG. 5C shows weights given to the short exposure pixels of a red channel. FIG. 5D shows weights given to the long exposure pixels of the red channel. FIG. 5E shows weights given to the short exposure pixels of a blue channel. FIG. 5F shows weights given to the long exposure pixels of the blue channel. Several terms will be defined to explain setting of the mismatching value "mis".

In FIGS. 5A through 5F, an expression "x:y" in each pixel indicates that the weight of a pixel "x" is "y". For instance, "g7:4" indicates that the weight of the pixel g7 is 4.

A first red weighted average "rs" is an interpolated value for the short exposure pixels of the red channel. A first red interpolated value "nor(rs)" is a value obtained by normalizing the first red weighted average "rs". A second red interpolated value "rl" is an interpolated value for the long exposure pixels of the red channel.

Likewise, a first green weighted average "gs", a first green interpolated value "nor(gs)", and a second green interpolated value "gl" are defined for the green channel and a first blue weighted average "bs", a first blue interpolated value "nor(bs)", and a second blue interpolated value "bl" are defined for the blue channel.

Referring to FIG. 5A, the pixels g1, g2, g3, g6, g7, g8, g11, g12, and g13 are short exposure pixels of the green channel in the N×N sub pixel array 300. The mismatching value setting block 403 sets the first green weighted average "gs" by interpolating the short exposure pixels g1, g2, g3, g6, g7, g8, g11, g12, and g13 of the green channel using Equation 4:

$$gs = \{g7*4 + (g2 + g6 + g8 + g12)*2 + (g1 + g3 + g11 + g13)\}/16$$

$$\text{nor}(gs) = gs*(\text{exposure\_long}/\text{exposure\_short}). \quad (4)$$

Thereafter, the mismatching value setting block 403 normalizes the first green weighted average "gs" to set the first green interpolated value "nor(gs)". Referring to Equation 4, the mismatching value setting block 403 may give a higher weight to each of the short exposure pixels g1, g2, g3, g6, g7, g8, g11, g12, and g13 which is closer to the central pixel g7 during the interpolation. For instance, the mismatching value setting block 403 gives a weight of 4 to the central pixel g7, a weight of 2 to the short exposure pixels g2, g6, g8, and g12 closest to the central pixel g7, and a weight of 1 to the short exposure pixels g1, g3, g11, and g13 second closest to the central pixel g7. The mismatching value setting block 403 calculates a weighted average of the pixel values of the short exposure pixels g1, g2, g3, g6, g7, g8, g11, g12, and g13 of the green channel based on the given weights and sets the weighted average as the first green weighted average "gs".

The mismatching value setting block 403 normalize the first green weighted average "gs" to set the first green interpolated value "nor(gs)". The normalizing may be performed by multiplying the weighted average by the second exposure time exposure_long and then dividing a multiplication result by the first exposure time exposure_short.

Referring to FIG. 5B, the pixels G4, G5, G9, and G10 are long exposure pixels of the green channel in the N×N sub pixel array 300. The mismatching value setting block 403 sets the second green weighted average "gl" by interpolating the long exposure pixels G4, G5, G9, and G10 of the green channel using Equation 5:

$$gl = (G4 + G5 + G9 + G10)/4. \quad (5)$$

Referring to Equation 5, the mismatching value setting block 403 may give a higher weight to each of the long exposure pixels G4, G5, G9, and G10 which is closer to the central pixel g7 during the interpolation. The long exposure pixels G4, G5, G9, and G10 of the green channel are separated from the central pixel g7 by the same distance. Accordingly, the mismatching value setting block 403 gives a weight of 1 to all of the long exposure pixels G4, G5, G9, and G10. The mismatching value setting block 403 calculates a weighted average of the pixel values of the long exposure pixels G4, G5, G9, and G10 of the green channel based on the given weights and sets the weighted average as the second green weighted average "gl".

The mismatching value setting block 403 sets the first red interpolated value "nor(rs)" and the first blue interpolated value "nor(bs)" using the same way as expressed by Equation 4 and sets the second red interpolated value "r1" and the second blue interpolated value "b1" using the same way as expressed by Equation 5.

Referring to FIGS. 5C through 5F, the mismatching value setting block 403 may set the first red interpolated value "nor(rs)", the second red interpolated value "r1", the first blue interpolated value "nor(bs)", and the second blue interpolated value "b1" using Equation 6.

$$rs=(r2+r3*2+r6)/4$$

$$\text{nor}(rs)=rs*(\text{exposure\_long/exposure\_short})$$

$$r1=(R1+R4*2+R5)/bs=(b2*2+b4+b6)/\text{nor}(bs)=bs* (\text{exposure\_long/exposure\_short})$$

$$b1=(B1+B3+B5*2)/4. \quad (6)$$

Based on the first green interpolated value "nor(gs)", the second green interpolated value "g1", the first red interpolated value "nor(rs)", the second red interpolated value "r1", the first blue interpolated value "nor(bs)", and the second blue interpolated value "b1", the mismatching value setting block 403 sets the mismatching value "mis" using Equation 7:

$$\text{mis}=\max\{|g1-\text{nor}(gs)|,|r1-\text{nor}(rs)|,|b1-\text{nor}(bs)|\}. \quad (7)$$

Referring to Equation 7, the mismatching value "mis" is a maximum value among a difference value "|g1−nor(gs)|" between the first green interpolated value "nor(gs)" and the second green interpolated value "g1", a difference value "|r1−nor(rs)|" between the first red interpolated value "nor(rs)" and the second red interpolated value "r1", and a difference value "|b1−nor(bs)|" between the first blue interpolated value "nor(bs)" and the second blue interpolated value "b1".

Hereinafter, the setting of the corrected value P' by the corrected value setting block 413 illustrated in FIG. 4 will be described with reference to FIGS. 6 and 7.

Figure 6:
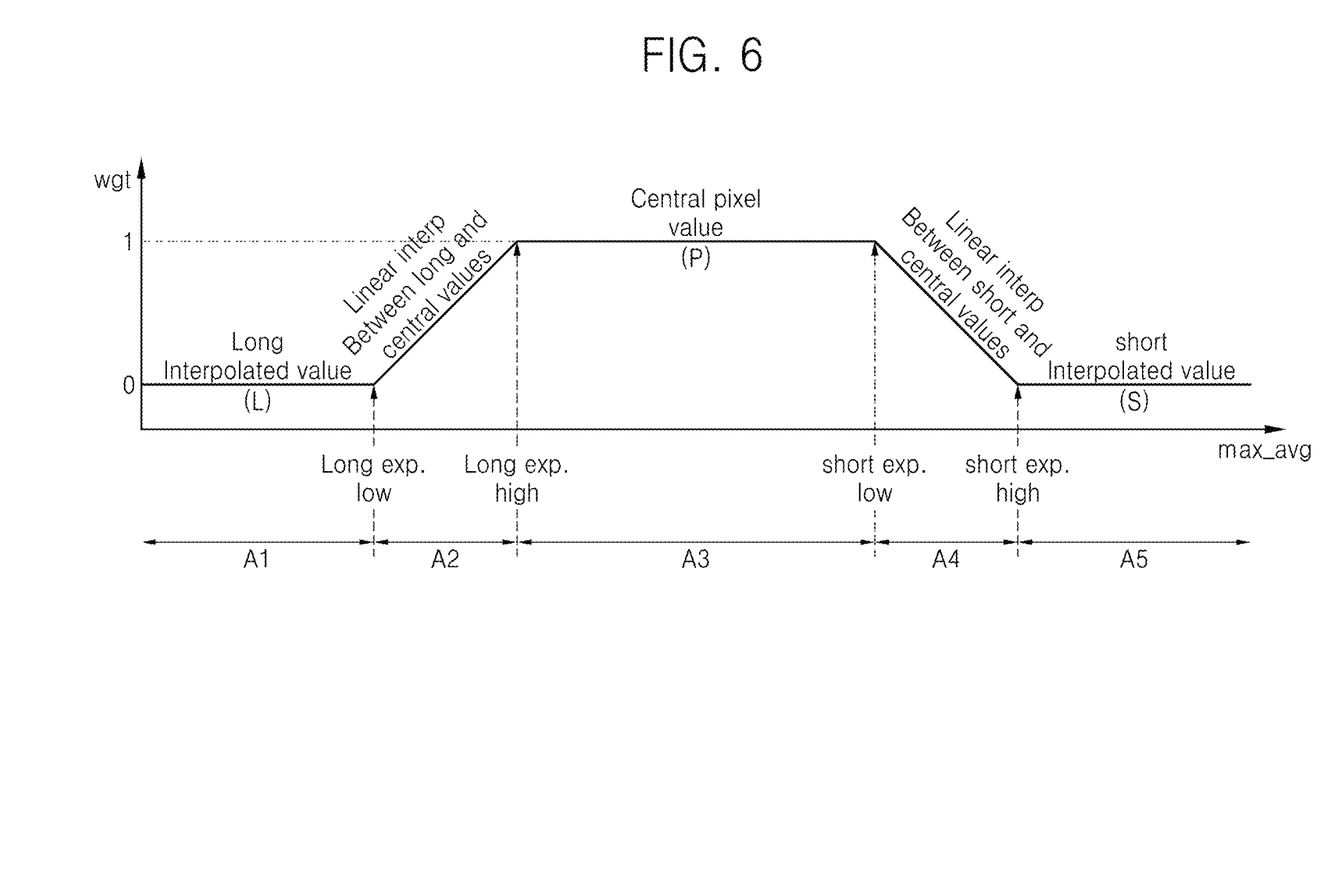
FIG. 6 is a graph of maximum average versus weight, which shows a corrected value of a central pixel at a mismatching value less than a threshold value.

FIG. 6 is a graph of maximum average versus weight, which shows the corrected value P' of a central pixel at the mismatching value "mis" less than the threshold value "th". The horizontal axis indicates the maximum average max_avg and the vertical axis indicates a weight "wgt" given to the central value P for the corrected value P'.

A first low "short exp.low", a first high "short exp.high", a second low "long exp.low", and a second high "long exp.high" are values set depending on a ratio between an exposure time exposure_short of first exposure pixels and an exposure time exposure_long of second exposure pixels, i.e., an exposure ratio. According to the first low "short exp.low", the first high "short exp.high", the second low "long exp.low", and the second high "long exp.high", the horizontal axis may be divided into five sections A1 through A5. The corrected value P' may be different depending on which of the sections A1 through A5 the maximum average max_avg belongs to. When the mismatching value "mis" is less than the threshold value "th", the corrected value setting block 413 may set the corrected value P' using the central value P. That the mismatching value "mis" is less than the threshold value "th" means that the first interpolated value S is almost the same as the second interpolated value L and an image of the N×N sub pixel array 300 does not have quick motion. Accordingly, even when the corrected value P' is set using the central value P, a ghost artifact may be produced.

Meanwhile, the corrected value setting block 413 may set the corrected value P' by performing interpolation with different weights given to the first interpolated value S, the second interpolated value L, and the central value P according to the maximum average max_avg. As the maximum average max_avg increases, long exposure pixels in the N×N sub pixel array 300 are more likely to be saturated. The corrected value setting block 413 may perform interpolation to gradually decrease the weight of the long exposure pixels and increase the weight of the short exposure pixels as the maximum average max_avg increases. In other words, the corrected value setting block 413 decreases the weight of the second interpolated value L and increases the first interpolated value S during the interpolation as the maximum average max_avg increases.

Referring to FIG. 6, when the maximum average max_avg is in the section A1, that is, when the maximum average max_avg is less than the second low "long exp.low", the corrected value P' is set to the second interpolated value L. When the maximum average max_avg is in the section A2, that is, when the maximum average max_avg is greater than the second low "long exp.low" and less than the second high "long exp.high", the corrected value P' is set to an interpolation value between the second interpolated value L and the central value P. When the maximum average max_avg is in the section A3, that is, when the maximum average max_avg is greater than the second high "long exp.high" and less than the first low "short exp.low", the corrected value P' is set to the central value P. When the maximum average max_avg is in the section A4, that is, when the maximum average max_avg is greater than the first low "short exp.low" and less than the first high "short exp.high", the corrected value P' is set to an interpolation value between the central value P and the first interpolated value S. When the maximum average max_avg is in the section A5, that is, when the maximum average max_avg is greater than the first high "short exp.high", the corrected value P' is set to the first interpolated value S.

The image signal processor 220 may gradually update the first low "short exp.low", the first high "short exp.high", the second low "long exp.low", and the second high "long exp.high" as the exposure ratio changes. For instance, the image signal processor 220 may set the first low "short exp.low", the first high "short exp.high", the second low "long exp.low", and the second high "long exp.high" as values for eliminating a signal-to-noise ratio (SNR) dip from an SNR graph. Accordingly, the image signal processor 220 may effectively control the trade-off between resolution and the dynamic range of an image.

In the sections A2 and A4, the corrected value P' may be a linear interpolation value between the central value P and the first interpolated value S or the second interpolated value L. For instance, the corrected value setting block 413 may set the corrected value P' using Equation 8:

$$P'=(1-wgt)*L+wgt*P(\text{section }A2)$$

$$P'=(1-wgt)*S+wgt*P(\text{section }A4). \quad (8)$$

Referring to Equation 8, the corrected value P' in the section A2 is a linear interpolation value between the central value P and the second interpolated value L and the corrected value P' in the section A4 is a linear interpolation value between the central value P and the first interpolated value S.

As described above, the corrected value setting block 413 sets the corrected value P' using the central value P when the mismatching value "mis" is less than the threshold value "th", so that high-resolution information can be obtained. In addition, the corrected value setting block 413 gradually decreases the weight of the second interpolated value L and increases the weight of the first interpolated value S as the maximum average max_avg increases during interpolation, so that pixel values of adjacent pixels are smoothly continuous with one another.

Figure 7:
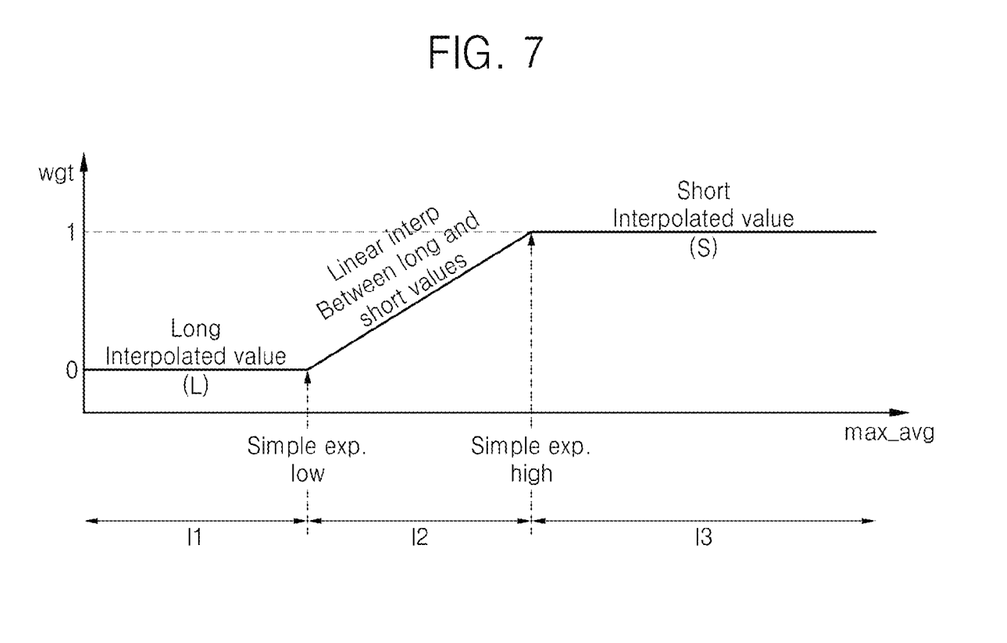
FIG. 7 is a graph of maximum average versus weight, which shows a corrected value of a central pixel at a mismatching value equal to or greater than a threshold value.

FIG. 7 is a graph of maximum average versus weight, which shows the corrected value P' of a central pixel at the mismatching value "mis" equal to or greater than the threshold value "th". The horizontal axis indicates the maximum average max_avg and the vertical axis indicates a weight "wgt" given to the first interpolated value S for the corrected value P'.

A third low "simple exp.low" and a third high "simple exp.high" are values set depending on a ratio between an exposure time exposure_short of first exposure pixels and an exposure time exposure_long of second exposure pixels. According to the third low "simple exp.low" and the third high "simple exp.high", the horizontal axis may be divided into three sections I1 through I3. The corrected value P' may be different depending on which of the sections I1 through I3 the maximum average max_avg belongs to.

When the mismatching value "mis" is equal to or greater than the threshold value "th", the corrected value setting block 413 sets the corrected value P' without using the central value P. That the mismatching value "mis" is equal to or greater than the threshold value "th" means that the first interpolated value S is different from the second interpolated value L and an image of the N×N sub pixel array 300 has quick motion. Accordingly, when the corrected value P' is set using the central value P, a ghost artifact may be produced.

Referring to FIG. 7, when the maximum average max_avg is in the section I1, that is, when the maximum average max_avg is less than the third low "simple exp.low", the corrected value P' is set to the second interpolated value L. When the maximum average max_avg is in the section I2, that is, when the maximum average max_avg is greater than the third low "simple exp.low" and less than the third high "simple exp.high", the corrected value P' is set to an interpolation value between the second interpolated value L and the first interpolated value S. When the maximum average max_avg is in the section I3, that is, when the maximum average max_avg is greater than the third high "simple exp.high", the corrected value P' is set to the first interpolated value S.

The image signal processor 220 may gradually update the third low "simple exp.low" and the third high "simple exp.high" as the exposure ratio changes. For instance, the image signal processor 220 may set the third low "simple exp.low" and the third high "simple exp.high" as values for eliminating an SNR dip from an SNR graph.

The third low "simple exp.low" may have the same value as the second low "long exp.low" and the third high "simple exp.high" may have the same value as the first high "short exp.high". However, inventive concepts are not restricted thereto.

In the section I2, the corrected value P' may be a linear combination value of the first interpolated value S and the second interpolated value L. For instance, the corrected value setting block 413 may set the corrected value P' using Equation 9:

$$P' = (1 - wgt) * L + wgt * S. \quad (9)$$

As described above, the corrected value setting block 413 sets the corrected value P' using a weighted average of the first interpolated value S and the second interpolated value L instead of the central value P when the mismatching value "mis" is equal to or greater than the threshold value "th", so that a ghost artifact is blurred. As described above, normalization may be performed on short exposure pixels in an image processing method according to some example embodiments of inventive concepts. In other words, while the pixel values and interpolated values of long exposure pixels are used as they are, the pixel values and interpolated values of short exposure pixels are multiplied by the second exposure time exposure_long and then divided by the first exposure time exposure_short in the normalization.

However, in other example embodiments, normalization may be performed on long exposure pixels. In other words, while the pixel values and interpolated values of short exposure pixels are used as they are, the pixel values and interpolated values of long exposure pixels are multiplied by the first exposure time exposure_short and then divided by the second exposure time exposure_long in the normalization.

The process of FIG. 6 and FIG. 7 is described as a "hard decision" process in which the mismatch value is compared against a programmable threshold "th". If mismatch "mis" is less than threshold "th" then the process of FIG. 6 is applied and if mismatch "mis" is larger than threshold "th" then the process of FIG. 7 is applied. However, inventive concepts are not restricted to a "hard decision" process. That is, we may gradually select between the process of FIG. 6 and the process of FIG. 7 as mismatch value "mis" is increased above the threshold "th", so that pixels of adjacent pixels are smoothly continuous with one another.

Figure 8:
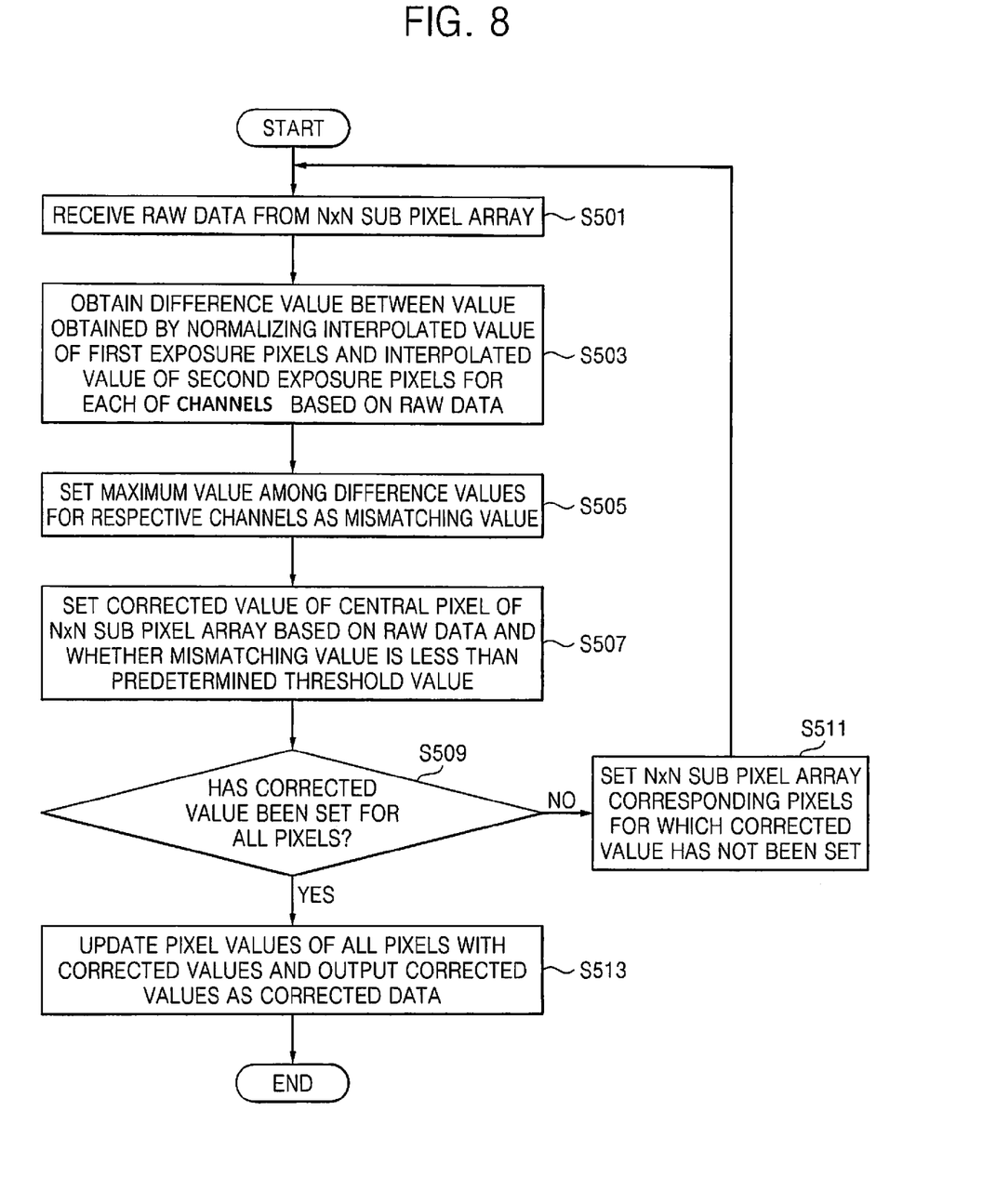
FIG. 8 is a flowchart of an image processing method according to at least one example embodiment of inventive concepts.

FIG. 8 is a flowchart of an image processing method according to at least one example embodiment of inventive concepts. Referring to FIGS. 1, 3, and 8, the image signal processor 220 receives N×N raw data from the N×N sub pixel array 300 including a plurality of first exposure pixels and second exposure pixels having different exposure times in operation S501.

The image signal processor 220 obtains a difference value between a value obtained by normalizing an interpolated value of the first exposure pixels for each of channels and an interpolated value of the second exposure pixels of each channel based on the N×N raw data in operation S503. The image signal processor 220 sets a maximum value among difference values obtained for the respective channels as a mismatching value in operation S505.

The image signal processor 220 sets a corrected value of the central pixel g7 in the N×N sub pixel array 300 based on whether the mismatching value is less than a threshold value and the N×N raw data in operation S507. The image signal processor 220 determines whether a corrected value has been set for every pixel in operation S509.

When a corrected value has not yet been set for all pixels, the image signal processor 220 sets an N×N sub pixel array corresponding to a pixel for which a corrected value has not yet been set in operation S511. Thereafter, the image signal processor 220 repeats operations S501 through S509.

When a corrected value has been set for all pixels, the image signal processor 220 updates the pixel values of all pixels with the corrected values and outputs the corrected values as corrected data in operation S513. The image signal processor 220 may output the corrected data or image data obtained by performing an additional process on the corrected data to the display unit 20.

Figure 9:
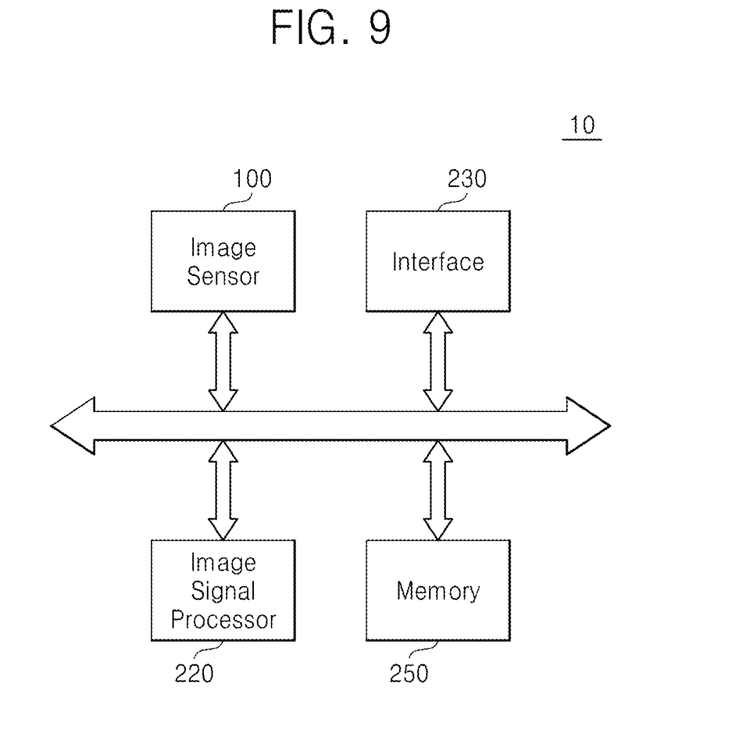
FIG. 9 is a block diagram of an image sensing system according to at least one example embodiment of inventive concepts.

FIG. 9 is a block diagram of an image sensing system 10 according to at least one example embodiment of inventive concepts. Referring to FIG. 9, the image sensing system 10 may be a digital camera, a mobile phone with an embedded digital camera, or any electronic device including a digital camera. The image sensing system 10 may process two-dimensional or three-dimensional image information. A digital camera includes an image signal processor according to at least one example embodiment of inventive concepts.

The image sensing system 10 may include the image sensor 100 and the image signal processor 220 controlling the operations of the image sensor 100.

The image sensing system 10 may also include an interface 230. The interface 230 may be an image display device or an input/output device. The image sensing system 10 may also include a memory device 250 that stores still or moving images captured by the image sensor 100 under the control of the image signal processor 220. The memory device 250 may be implemented by a non-volatile memory device, which may include a plurality of non-volatile memory cells.

Each of the non-volatile memory cells may be implemented using electrically erasable programmable read-only memory (EEPROM), flash memory, magnetic RAM (MRAM), spin-transfer torque MRAM, conductive bridging RAM (CBRAM), ferroelectric RAM (FeRAM), phase change RAM (PRAM) called as ovonic unified memory (OUM), resistive RAM (RRAM or ReRAM), nanotube RRAM, polymer RAM (PoRAM), nano floating gate memory (NFGM), holographic memory, molecular electronics memory device), or insulator resistance change memory.

Figure 10:
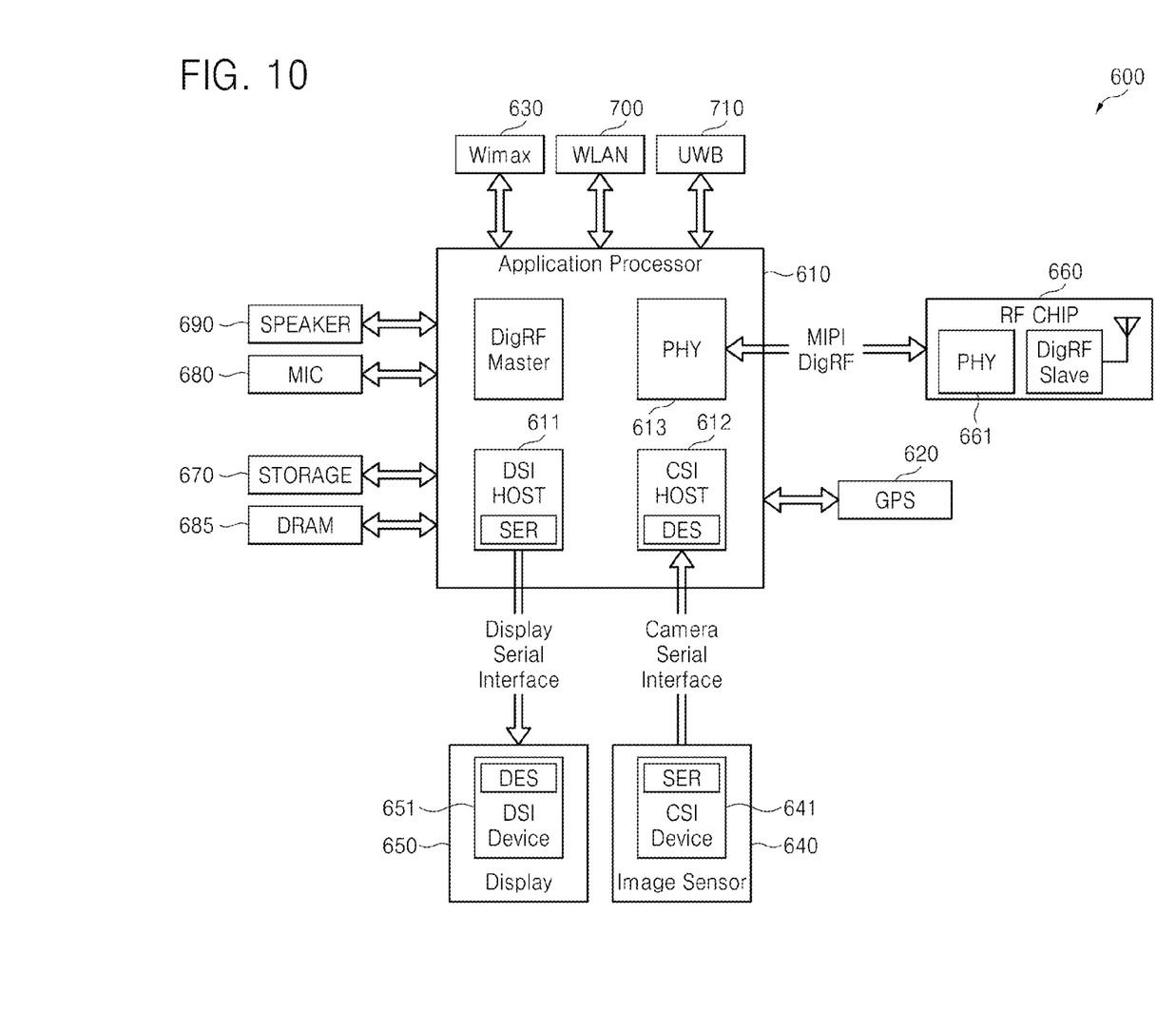
FIG. 10 is a block diagram of an electronic system including an image sensor according to at least one example embodiment of inventive concepts.

FIG. 10 is a block diagram of an electronic system including an image sensor according to at least one example embodiment of inventive concepts. The electronic system 600 may be implemented by a data processing apparatus, such as a mobile phone, a personal digital assistant (PDA), a portable media player (PMP), an IP TV, or a smart phone that can use or support the MIPI interface. The electronic system 600 includes an application processor 610, an image sensor 640, and a display 650.

A CSI host 612 included in the application processor 610 performs serial communication with a CSI device 641 included in the image sensor 640 through CSI. For example, an optical serializer may be implemented in the CSI host 612, and an optical de-serializer may be implemented in the CSI device 641.

A DSI host 611 included in the application processor 610 performs serial communication with a DSI device 651 included in the display 650 through DSI. For example, an optical serializer may be implemented in the DSI host 611, and an optical de-serializer may be implemented in the DSI device 651.

The electronic system 600 may also include a radio frequency (RF) chip 660 which communicates with the application processor 610. A physical layer (PHY) 613 of the electronic system 600 and a PHY of the RF chip 660 communicate data with each other according to a MIPI DigRF standard. The electronic system 600 may further include at least one element among a GPS 620, a storage device 670, a microphone 680, a DRAM 685 and a speaker 690. The electronic system 600 may communicate using Wimax 630, WLAN 700 or USB 710, etc.

As described above, according to example embodiments of inventive concepts, an image processor eliminates ghost artifacts using blurring and corrects pixel values to allow the pixel values of adjacent pixels to be smoothly continuous with each other, thereby increasing the quality of images.

While inventive concepts have been particularly shown and described with reference to example embodiments thereof, it will be understood by those of ordinary skill in the art that various changes in forms and details may be made therein without departing from the spirit and scope of inventive concepts as defined by the following claims.

What is claimed is:

1. An image signal processor comprising:
a receiver configured to receive N×N raw data from an N×N sub pixel array including a plurality of first exposure pixels and second exposure pixels having different exposure times and a plurality of channels;
a mismatching value setting block configured to obtain a difference value between a value obtained by normalizing an interpolated value of the first exposure pixels and an interpolated value of the second exposure pixels for each channel in the N×N sub pixel array based on the N×N raw data and to set a mismatching value to a maximum value among difference values obtained for the respective channels;
a corrected value setting block configured to set a corrected value of a central pixel in the N×N sub pixel array based on the N×N raw data and based on the mismatching value and a threshold value;
a corrected data output unit configured to sequentially receive corrected values of pixels from the corrected value setting block and to generate and output corrected data by updating pixel values of pixels with the corrected values;
a first interpolated value setting block configured to set a first interpolated value to a value obtained by normalizing an interpolated value of the first exposure pixels having the same channel as the central pixel in the N×N sub pixel array based on the N×N raw data;
a second interpolated value setting block configured to set a second interpolated value to a value obtained by normalizing an interpolated value of the second exposure pixels having the same channel as the central pixel in the N×N sub pixel array based on the N×N raw data; and
a central value setting block configured to set a central value to a value obtained by normalizing a pixel value of the central pixel when the central pixel is one of the plurality of first exposure pixels and to the pixel value of the central pixel when the central pixel is one of the plurality of second exposure pixels based on the N×N raw data,
wherein the corrected value setting block is configured to set the corrected value based on the first interpolated value, the second interpolated value, and the central value when the mismatching value is less than the threshold value and based on the first interpolated value and the second interpolated value when the mismatching value is equal to or greater than the threshold value.

2. The image signal processor of claim 1, further comprising:
a maximum average setting block configured to obtain a maximum value among pixel values in each of a plurality of adjacent areas of the central pixel based on the N×N raw data and to set a maximum average to a weighted average of the maximum values of the respective adjacent areas,
wherein the corrected value setting block is configured to set the corrected value through interpolation in which the first interpolated value, the second interpolated value, and the central value are given a different weight according to whether the mismatching value is less than the threshold value and a level of the maximum average.

3. The image signal processor of claim 2, wherein
the corrected value setting block is configured to set first and second highs and first and second lows based on a ratio between an exposure time of the first exposure pixels and an exposure time of the second exposure pixels; and
the corrected value setting block is configured to set the corrected value such that when the mismatching value is less than the threshold value, the corrected value is the second interpolated value when the maximum average is less than the second low, is an interpolation value between the second interpolated value and the central value when the maximum average is greater than the second low and less than the second high, is the central value when the maximum average is greater than the second high and less than the first low, and is an interpolation value between the central value and the first interpolated value when the maximum average is greater than the first low and less than the first high, and is the first interpolated value when the maximum average is greater than the first high.

4. The image signal processor of claim 3, wherein
the corrected value setting block is configured to set a third low and a third high based on a ratio between an exposure time of the first exposure pixels and an exposure time of the second exposure pixels; and
the corrected value setting block is configured to set the corrected value such that when the mismatching value is equal to or greater than the threshold value, the corrected value is the second interpolated value when the maximum average is less than the third low, is an interpolation value between the second interpolated value and the first interpolated value when the maximum average is greater than the third low and less than the third high, and is the first interpolated value when the corrected value is greater than the third high.

5. The image signal processor of claim 1, wherein the value obtained by normalizing the pixel value of the central pixel is a value obtained by multiplying the pixel value of the central pixel by a second exposure time and dividing a multiplication result by a first exposure time.

6. A system comprising:
an image sensor configured to generate N×N raw data as pixel values from an N×N sub pixel array having a plurality of pixels, the plurality of pixels associated with one of a plurality of colors and being one of a first exposure type and a second exposure type, a first exposure time of the first exposure type being less than a second exposure time of the second exposure type; and
an image signal processor configured to receive the pixel values, generate a difference value based on interpolated values of pixels of different exposure types and associated with the same color, adjust a selected pixel value of the pixel values based on a first process or a second process, the image signal processor configured to select the first process or the second process based on the difference value, the selected pixel value associated with a selected pixel of the plurality of pixels, the image signal processor including,
a first interpolated value setting block configured to set a first interpolated value to a value obtained by normalizing an interpolated value of the first exposure type pixels having a same channel as a central pixel in the N×N sub pixel array based on the pixel values, the central pixel being the selected pixel,
a second interpolated value setting block configured to set a second interpolated value to a value obtained by normalizing an interpolated value of the second exposure types pixels having the same channel as the central pixel in the N×N sub pixel array based on the pixel values, and
a central value setting block configured to set a central value to a value obtained by normalizing a pixel value of the central pixel when the central pixel is one of the plurality of first exposure types pixels and to the pixel value of the central pixel when the central pixel is one of the plurality of second exposure type pixels based on the pixel values, and
a corrected value setting block is configured to set a corrected value of the central pixel based on the first interpolated value, the second interpolated value, and the central value when a mismatching value is less than a threshold value and based on the first interpolated value and the second interpolated value when the mismatching value is equal to or greater than the threshold value.

7. The system of claim 6, wherein the image signal processor is configured to generate a maximum average based on maximum values among the pixels values in respective areas of the image sensor, the first process and the second process being based on the maximum average.

8. The system of claim 6, wherein the image signal processor is configured to adjust the selected pixel value based on weighted values of the first and second interpolated values.

9. The system of claim 6, wherein the image signal processor is configured to assign different weights to the first and second interpolated values based on whether the difference value exceeds the threshold value.

* * * * *